United States Patent [19]

Maxfield et al.

[11] Patent Number: 4,472,488

[45] Date of Patent: Sep. 18, 1984

[54] POLYMERIC ELECTRODE COATED WITH REACTION PRODUCT OF CYCLIC COMPOUND

[75] Inventors: Macrae Maxfield, North Plainfield; Lawrence W. Shacklette, Maplewood; Ronald L. Elsenbaumer, Morristown, all of N.J.

[73] Assignee: Allied Corporation, Morris Township, Morris County, N.J.

[21] Appl. No.: 556,720

[22] Filed: Nov. 30, 1983

[51] Int. Cl.$^3$ ............................................. H01M 4/60
[52] U.S. Cl. ................................... 429/213; 429/122; 252/182.1
[58] Field of Search ................ 429/213, 122; 525/275, 525/328.1; 252/182.1

[56] References Cited

U.S. PATENT DOCUMENTS

| | | | |
|---|---|---|---|
| 4,321,114 | 3/1982 | MacDiarmid et al. | 429/213 |
| 4,343,871 | 8/1982 | Tobishima et al. | 429/213 |
| 4,394,304 | 7/1983 | Wnek | 525/275 |
| 4,401,545 | 8/1983 | Naarman et al. | 429/213 |
| 4,442,187 | 4/1984 | MacDiarmid et al. | 429/213 |

FOREIGN PATENT DOCUMENTS

| | | | |
|---|---|---|---|
| 50441 | 4/1982 | European Pat. Off. | 429/213 |
| 1216549 | 12/1970 | United Kingdom | 429/213 |

OTHER PUBLICATIONS

Kaneto et al., Japanese Journal of Applied Physics, vol. 22, No. 9, Sep. 1983, pp. L567-L568.
Kaneto et al., Japanese Journal of Applied Physics, vol. 22, No. 7, Jul. 1983, pp. L412-L414.

*Primary Examiner*—Brian E. Hearn
*Assistant Examiner*—Gerard P. Rooney
*Attorney, Agent, or Firm*—Alan M. Doernberg; Gerhard H. Fuchs

[57] ABSTRACT

Batteries are disclosed with electrodes, especially cathodes, having a conjugated backbone polymer such as polyacetylene as electroactive material and a coating. The coating is formed by reaction between the oxidized polymer and a pyrrole, thiophene, azulene, furan or aniline compound.

17 Claims, No Drawings

POLYMERIC ELECTRODE COATED WITH REACTION PRODUCT OF CYCLIC COMPOUND

The present invention relates to polymeric electrodes, and especially such electrodes having conjugated backbone polymers as the electroactive material coated with the product of reaction between oxidized conjugated backbone polymer and a cyclic material such as pyrrole or thiophene.

Conjugated backbone polymers e.g., polyacetylene, have been disclosed as useful in secondary batteries as an electroactive material. See U.S. Pat. No. 4,321,114 to MacDiarmid et al. (1981). Also indicated as suitable for such batteries are polyphenylenes, poly(phenylene sulfides), poly(phenylene vinylene), polypyrrole "and the like" (column 4, lines 58–63 of U.S. Pat. No. 4,321,114). Further discussion of polypyrrole as an active electrode material is contained, e.g., in J. de Physique, Colloque C3, vol. 44 (1983), articles beginning on page 579, page 615 and page 537. The use of polythiophene (the sulfur analog of polypyrrole) as an electroactive material in batteries is described in K. Kaneto et al., Japanese J. of Applied Physics, vol. 22, pp. L567–L568 (September 1983) and pp. L412–L414 (July 1983).

Composite structures of a conjugated backbone polymer and a non-electroactive material have been described in U.S. Pat. No. 4,394,304 and in the above J. de Physique issue, articles beginning on page 137 and on page 151. Representative other components that have been blended with polyacetylene or onto which polyacetylene or polypyrrole have been deposited include polyethylene, polystyrene, graphite, nickel current collectors, NESA glass and silicon. In selected instances, such composite structures have been suggested for use in batteries. See Showa Denko, K.K., European Published Patent Application 76,119 (1982).

Copending, commonly assigned patent applications U.S. Ser. No. 393,010 (June 28, 1982), now abandoned, and 432,045 (Sept. 30, 1982), both of Frommer et al., disclose conductive solutions, such as poly(phenylene sulfide) in liquid arsenic trifluoride solvent plus arsenic pentafluoride dopant from which conductive films can be cast. In U.S. Ser. No. 432,045, other conjugated backbone polymers are indicated as suitable fourth components (page 6, lines 12–19, and page 8, line 37–page 9, line 2) and as materials onto which the films may be cast, with resulting doping of the substrate (page 9, line 31–page 10, line 1). See also copending commonly assigned U.S. Ser. No. 432,043 of Shacklette et al. (Sept. 30, 1982).

BRIEF DESCRIPTION OF THE INVENTION

It has been discovered that acceptor-doped (oxidized) conjugated backbone polymers can be used as substrates for the formation of films from cyclic compounds such as pyrrole or thiophene, and that such films offer advantageous properties on the conjugated backbone polymer when used as the electroactive material of an electrode, and especially a battery electrode, and more especially a battery cathode into which anions are inserted during the charging of the battery. Accordingly, the present invention includes a polymeric battery electrode comprising a conjugated backbone polymer as electroactive material and a surface coating which is the product of reaction between the oxidized conjugated backbone polymer and a cyclic compound selected from the group consisting of pyrrole, thiophene, azulene, furan, aniline and substituted forms thereof, provided that the oxidized conjugated backbone polymer does not correspond to the polymer formed by homopolymerization of the cyclic compound. Such battery electrodes find particular utility as a cathode into which anions are inserted during the charging of the battery.

DETAILED DESCRIPTION OF THE INVENTION

A variety of conjugated backbone polymers may be used as the principal electroactive material of the present electrodes: e.g., polyacetylene, polyphenylenes, poly(phenylene vinylene), polynaphthalene, polyacenes, poly(phenylene sulfide), poly(phenylene oxide), polyphenothiazine, polythianthrene, polythiophene (provided that the coating is not formed from thiophene), and suitably substituted derivatives of these polymers. Preferred such polymers include polyacetylene and poly(p-phenylene).

Coatings may be formed from cyclic compounds which are pyrrole, thiophene, azulene, furan or aniline or substituted forms thereof such as 3-methylthiophene, 3,4-dimethylthiophene, N-methylpyrrole, 3,4-dimethylpyrrole, N-methylcarbazole, indole, 2,3-benzofuran, 3-phenylthiophene, 3,4-dibromothiophene and 3-cyanomethylthiophene. It will be appreciated that several of the above-listed substituted forms (especially of pyrrole) have fused ring structures, as in carbazole and indole. For polyacetylene and other moderate voltage oxidized polymers, any of the cyclic compounds described above may be used; but thiophene, pyrrole and certain substituted forms thereof (especially 3-methylthiophene, 3,4-dimethylthiophene and 3,4-dimethylpyrrole) are preferred. For poly(p-phenylene) and other high voltage oxidized polymers, any of the cyclic compounds may be used, but pyrroles are less preferred, with the preferred cyclic compounds then including thiophenes and furans generally, and thiophene, 3-methylthiophene, 3,4-dimethylthiophene, 3-phenylthiophene and 2,3-dibromothiophene especially. For polythiophene and other low voltage oxidized polymers, thiophenes substituted with electron withdrawing groups are not preferred (and in the case of polythiophene itself, unsubstituted thiophene is excluded as a cyclic material). While, in general, the oxidized polymers after coating are preferably cycled between oxidized and neutral (or less oxidized) states by insertion and removal of anions (as in the case of a polymer battery cathode or positive electrode), certain coated polymers may be reduced beyond the neutral point to a reduced form and then cycled between reduced and neutral (or less reduced) states by insertion and removal of cations (as a polymer battery anode or negative electrode). Likely candidates for such reduced polymer electrodes are polyacetylene which has been coated by exposure to azulene or thiophene when the polymer was in the oxidized state and thereafter was reduced, during which process the anions present in the oxidized polymer are removed and cations present in the electrolyte or in the reducing agent are inserted into the now-coated polymer.

Coating may be formed by contact of oxidized polymer and coating precursor (pyrrole, thiophene, etc.) either by immersion in liquid or exposure to vapor. Coating may also be formed in situ in an electrochemical cell by adding the coating precursor to the electrolyte. In the latter case the solvent should be one which is inert to the oxidized polymer: e.g., propylene carbonate, sulfolane, 3 Me-sulfolane, 2,4-dimethylsulfolane, acetonitrile, propionitrile, benzonitrile, butyronitrile, nitromethane, nitroethane, nitrobenzene, dichloromethane. The substrate polymer is oxidized (acceptor-doped) and the coating is formed concurrently.

The surface coating is expected to be a conducting polymer which will have both electronic and ionic conductivity. The surface coating is also expected to be electroactive. During battery operation, ions from the electrolyte are expected to diffuse through and be incorporated into both the coating polymer and the substrate polymer.

Electrodes are expected to be composed of between 0.5 and 25% coating polymer by weight.

The voltage range of electroactivity of the surface polymer should overlap the voltage range for the underlying polymer (preferably to a large degree). In the case of coatings on oxidized polymers it is preferable that the coating become electroactive (i.e., be electrochemically doped, or oxidized) at a lower anodic potential than the substrate polymer (e.g., polypyrrole on polyacetylene) or at approximately the same potential (e.g., poly(3-Me-thiophene) on polyacetylene). The anodes and electrolytes for the present batteries can be of conventional types, as described in U.S. Pat. No. 4,321,114, and especially can be the coated anodes of copending, commonly-assigned applications filed herewith:

(1) U.S. Ser. No. 556,739—sultone- and sulfonate-coated polymer anodes (e.g. propane sultone-coated polyacetylene).

(2) U.S. Ser. No. 556,735—oxirane compound-coated polymer anodes (e.g. ethylene oxide-coated polyacetylene);

(3) U.S. Ser. No. 556,747—electrolyte containing alkali metal hexafluorophosphate salt (such as $KPF_6$ in tetrahydrofuran/dimethyl ether);

(4) U.S. Ser. No. 556,717—sultone solvent in electrolyte.

The disclosure of the above-referenced applications are incorporated herein by reference especially insofar as they relate to batteries with conjugated backbone polymer cathodes.

Advantages to be expected from preferred combinations in batteries include:

(a) lower cell resistance due to improved electrical contact;

(b) higher stability against environmental exposure;

(c) higher stability against decomposition of electrolyte;

(d) use of a high capacity (i.e., charge stored per weight) polymer as a substrate polymer (e.g., PA) allows the technology to be used to its best advantage.

EXAMPLES

Example 1

A 1.2 $cm^2$ sample of polyacetylene (PA) polymerized on Pt gauze and pressed to high density (approximately 0.9 $g/cm^3$) was oxidized by applying 3.8 V between it and a Li counter electrode in a cell with one molar $LiClO_4$ in propylene carbonate (PC) for 20 h. The minimum internal resistance (Ri) was 60Ω. The PA electrode was removed from the cell and immersed in 0.2 ml of freshly distilled pyrrole ($C_4H_5N$). The pyrrole turned purple at the PA surface, and within 10 minutes a black coating covered the PA plus the Pt wire lead exposed to the pyrrole. (The same effect was achieved by the addition of pyrrole directly to the Li/PA+ cell standing at an applied voltage of 3.8 V which caused the current to increase from 10 µA to 2.7 mA in 10 min.). The PA was washed 5 times in acetonitrile and three times in one molar $LiClO_4$ in propylene carbonate before it was returned to the cell. The reassembled cell was cycled 3 times with minimum Ri's of 20–25Ω and coulombic efficiency of 84–85%. Two of the cycles were performed at constant current and exhibited capacities of 0.83 $mAh/cm^2$ and 0.92 $mAh/cm^2$ at 2.0 $mA/cm^2$ and 1.0 $mA/cm^2$ respectively. Elemental analysis of a similarly-treated piece of unsupported low density PA revealed 3.23% N, 82.04% C, 7.13% H and 0.89% ash which is consistent with $[CH(C_4H_3N)_{0.038}]$. The remaining 6.71% presumably is $ClO_4^-$ (about 1% of residual dopant).

Example 2

A 1.0 $cm^2$ sample of low density (0.4 $g/cm^3$) PA weighing 8 mg was wrapped in Pt gauze, placed in a cell with one molar $LiClO_4$ in propylene carbonate and a Li counter electrode. The cell was charged at 3.8 V for 16 hours, with a minimum internal resistance of 60Ω. Freshly distilled thiophene (0.2 ml) was added causing the current through the cell to increase from 20 µA to 1 mA. After an additional 2.48 coulombs had passed (0.04e- per CH unit) the PA electrode was removed and washed 4 times in acetonitrile and 2 times in fresh $LiClO_4$ in propylene carbonate before transferring it to a new cell with fresh one molar $LiClO_4$ in propylene carbonate and separator. After discharging the cell to 2.5 V for several hours, it was cycled between 2.5 V and 3.9 V. On charging the cell, the minimum Ri was ca. 20Ω. The capacity of the discharge (0.84 $mA/cm^2$; coulombic efficiency=78%) was equivalent to 5.1% oxidation of the polyacetylene (i.e., 5.1 electrons per 100 CH units).

A similar piece of PA was electrochemically oxidized at 3.8 V vs. Li+/Li, and then soaked in neat thiophene for five hours. After washing five times in acetonitrile, it was dried in vacuo. The elemental analyis found, 4.19% S, 74.13% C and 6.50% H, was consistent with $[CH(C_4H_2S)_{0.023}]$.

What is claimed is:

1. A polymeric battery electrode comprising a conjugated backbone polymer as electroactive material and a surface coating which is the product of reaction between the oxidized conjugated backbone polymer and a cyclic compound selected from the group consisting of pyrrole, thiophene, azulene, furan, aniline and substituted forms thereof.

2. The polymeric battery electrode of claim 1 wherein the cyclic compound is pyrrole.

3. The polymeric battery electrode of claim 2 wherein said conjugated backbone polymer is polyacetylene.

4. The polymeric battery electrode of claim 1 wherein said cyclic compound is thiophene.

5. The polymeric battery electrode of claim 4 wherein said conjugated backbone polymer is polyacetylene.

6. The polymeric battery electrode of claim 1 wherein said cyclic compound is selected from the group consisting of 3-methylthiophene, 3,4-dimethylthiophene and 3,4-dimethylpyrrole.

7. The polymeric battery electrode of claim 6 wherein said conjugated backbone polymer is polyacetylene.

8. The polymeric battery electrode of claim 1 wherein said conjugated backbone polymer is polyacetylene.

9. The polymeric battery electrode of claim 1 wherein said conjugated backbone polymer is poly(p-phenylene).

10. A battery comprising at least two electrodes, at least one of which is the polymeric battery electrode of claim 1.

11. The battery of claim 10 wherein said polymeric battery electrode is a cathode into which anions are inserted during the charging of said battery.

12. The battery of claim 11 wherein said heterocyclic compound is selected from the group consisting of pyrrole, thiophene, 3-methylthiophene, 3,4-dimethylthiophene and 3,4-dimethylpyrrole.

13. The battery of claim 12 wherein said conjugated backbone polymer is polyacetylene.

14. The battery of claim 11 wherein said conjugated backbone polymer is polyacetylene.

15. The battery of claim 11 wherein said conjugated backbone polymer is poly(p-phenylene).

16. The battery of claim 15 wherein the cyclic compound is a thiophene or furan.

17. The battery of claim 16 wherein the cyclic compound is thiophene, 3-methylthiophene, 3,4-dimethylthiophene, 3-phenylthiophene or 2,3-dibromothiophene.

* * * * *